United States Patent [19]

Iwakura et al.

[11] Patent Number: 4,958,451

[45] Date of Patent: Sep. 25, 1990

[54] MOTORCYCLE LICENSE PLATE MOUNTING MECHANISM

[75] Inventors: Masato Iwakura, Saitama; Hiroshi Nakano, Tokyo, both of Japan

[73] Assignee: Honda Giken Kogyo Kabushiki Kaisha, Tokyo, Japan

[21] Appl. No.: 780,240

[22] Filed: Sep. 26, 1985

Related U.S. Application Data

[63] Continuation of Ser. No. 418,958, Sep. 16, 1982, abandoned.

[30] Foreign Application Priority Data

Sep. 19, 1981 [JP] Japan ............................. 56-148252

[51] Int. Cl.$^5$ ............................................. G09F 13/02
[52] U.S. Cl. ...................................................... 40/204
[58] Field of Search ................. D12/110; 40/204–210; 411/371; 340/134; 362/226

[56] References Cited

U.S. PATENT DOCUMENTS

| D. 149,968 | 6/1948 | Oertle et al. | D12/110 |
|---|---|---|---|
| D. 274,713 | 7/1984 | Morioka et al. | D12/110 |
| 1,444,669 | 2/1923 | Dillard et al. | 40/489 |
| 1,513,300 | 10/1924 | Vose | 40/204 |
| 1,692,469 | 11/1928 | Rex | 411/381 X |
| 3,828,178 | 8/1974 | Bickel | 340/134 X |
| 3,916,377 | 10/1975 | Demeter | 340/134 X |
| 4,077,145 | 3/1978 | Smoczynski | 40/591 |
| 4,356,536 | 10/1982 | Funabashi et al. | 362/226 |

OTHER PUBLICATIONS

1974 Harley Davidson Motorcycle Brochure, (Inner Pages).
Photograph of a Police Special Indian Four BSA Motorcycle Brochure, (pp. 16 and 17).
Cycle World, Oct. 1969, pp. 1–16.

Primary Examiner—Kenneth J. Dorner
Assistant Examiner—J. Hakomaki
Attorney, Agent, or Firm—Sughrue, Mion, Zinn, Macpeak & Seas

[57] ABSTRACT

A motorcycle is provided with a rear license plate assembly and lamp separate from a tail light, to facilitate placement of the license plate at a more readily viewable position.

9 Claims, 7 Drawing Sheets

MOTORCYCLE LICENSE PLATE MOUNTING MECHANISM

This application is a continuation of application Ser. No. 418958, filed Sept. 16, 1982, now abandoned.

BACKGROUND OF THE INVENTION

The present invention relates to a motorcycle and, more particularly, to a construction for attaching a license plate to a motorcycle, and to an adjustable license lamp therefor. Generally, the license plate of a motorcycle is fixed in the assembly of the motorcycle to such a portion of the latter as will permit easy visual observation. It is often experienced, however, that the license plate is hidden when the motorcycle carries luggage or when optional parts are attached to the motorcycle.

In motorcycles, the license plate is mounted immediately under the tail lamp. A transparent plate is commonly provided in the lower side of the tail lamp so that the light from the tail lamp is transmitted to illuminate the license plate. Namely, the license plate 1 shown by the imaginary line in FIG. 1 has to be mounted in close proximity to the tail lamp for illuminating the license plate. Since the mounting position of the tail lamp is generally restricted, the license plate is inevitably mounted at such a low level as to permit easy contamination thereof by, for example, splashing mud.

SUMMARY OF THE INVENTION

Accordingly, it is an object of this invention to provide a motorcycle which permits an easy change of position of the license plate to optimize the position of the license plate on the motorcycle.

To this end, according to the invention, there is provide a motorcycle charactered by comprising a license plate detachably attached to the chassis of the motorcycle, the position of attachment of the license plate being changeable.

The present invention also proposes to construct the license lamp of the motorcycle as a body separate from the tail lamp so as to make it possible to mount the license plate at any desired level above the tail lamp without being restricted by the position of the tail lamp, to thereby prevent the contamination thereof by splashing mud while improving the appearance thereof, to thereby enhance the commercial value of the motorcycle.

DETAILED DESCRIPTION OF THE PREFERRED EMBODIMENTS

Figure 1:
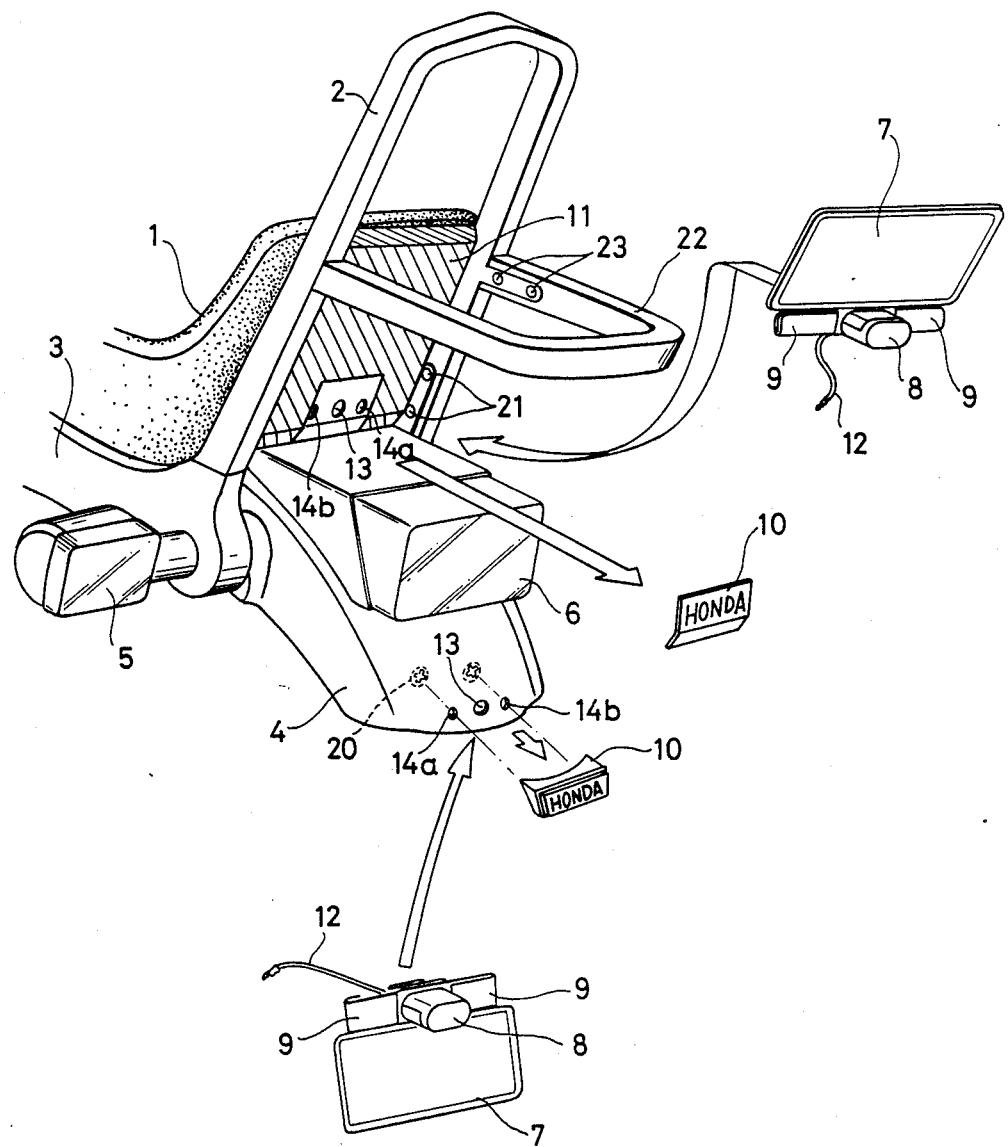
FIG. 1 is a schematic perspective view of the rear portion of a motorcycle.

FIG. 1 is a schematic perspective view of the rear portion of a motorcycle. In this figure, reference numeral 1 denotes a seat, 2 denotes a grip member integral with a rear stay 3, 4 denotes a rear fender, 5 denotes a rear blinker and 6 denotes a tail lamp. A license plate 7, a license lamp 8 for illuminating the license plate 7 during night running and a reflector 9 are constructed as one body. The rear end of the seat 1 and the rear end of the rear fender 4 are selected as the license plate attaching positions, which permit an easy visual observation of the license plate. When the license plate 7 is attached to one of these two positions, the other position is utilized as a position for a mark plate 10 bearing, for example, the name or emblem of the manufacturer.

Figure 2:
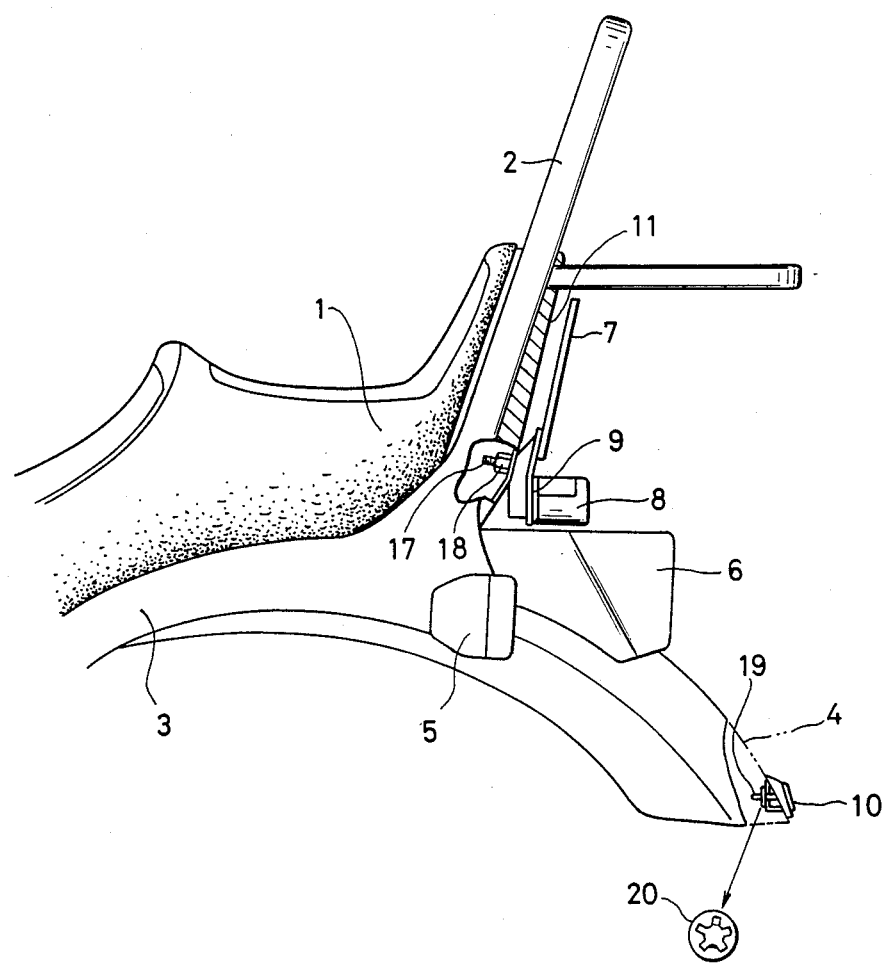
FIGS. 2 and 3 are partly-sectioned side elevational views showing different attachment positions of a license plate.
Figure 3:
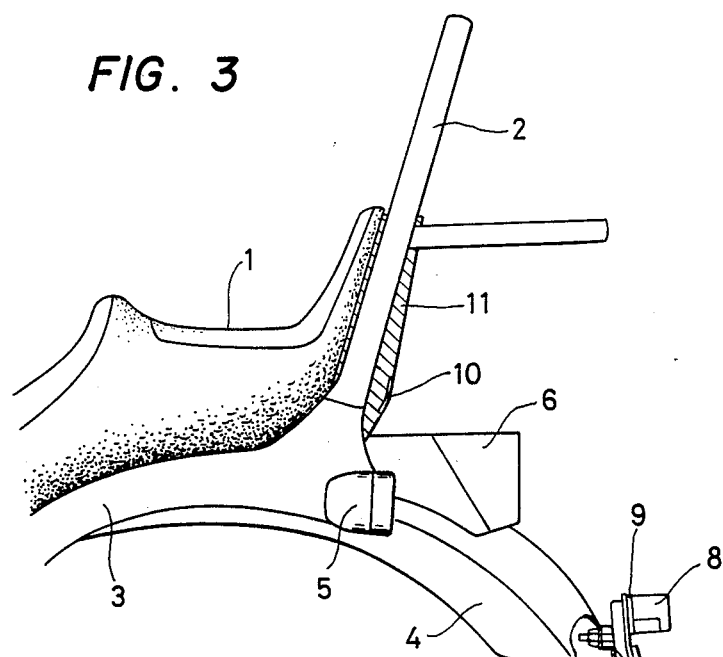
Figure 4:
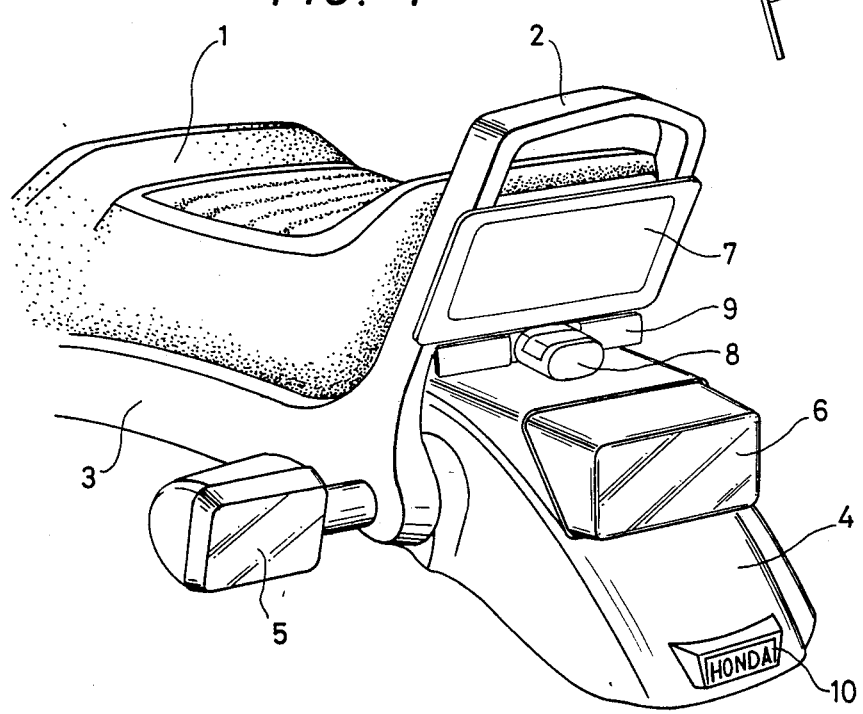
FIG. 4 is a schematic perspective view of a modification having a different form of rear grip member.

A supporting member 11 is disposed at the rear side of the seat 1, for securing the license plate 7. A lead hole 13 for passing electric wires 12 connected to the license lamp 8 and a pair of bolt holes 14a, 14b are formed in the supporting member 11. A similar lead hole 13 and bolt holes 14a, 14b are formed in the rear end portion of the rear fender 4. FIG. 2 is a partly-sectioned side elevational view of the rear part of a motorcycle having the license plate 7 attached to the rear side of the seat 1, while FIG. 3 is a partly-sectioned side elevational view of the rear part of a motorcycle having the license plate attached to the rear end surface of the rear fender 4. In either case, the license plate 7 is fixed by screwing nuts 18 onto the bolts 17, while the mark plate 10 is fixed by screwing flat nuts 20 onto the bolts 19. The grip member 2 is detachably secured to the body by nuts 21. As will be seen from FIG. 4, this grip member 2 can easily be replaced with member 2'. An auxiliary member or carrier 22 may be detachably secured to the grip member 2 by means of nuts 23.

Figure 5:
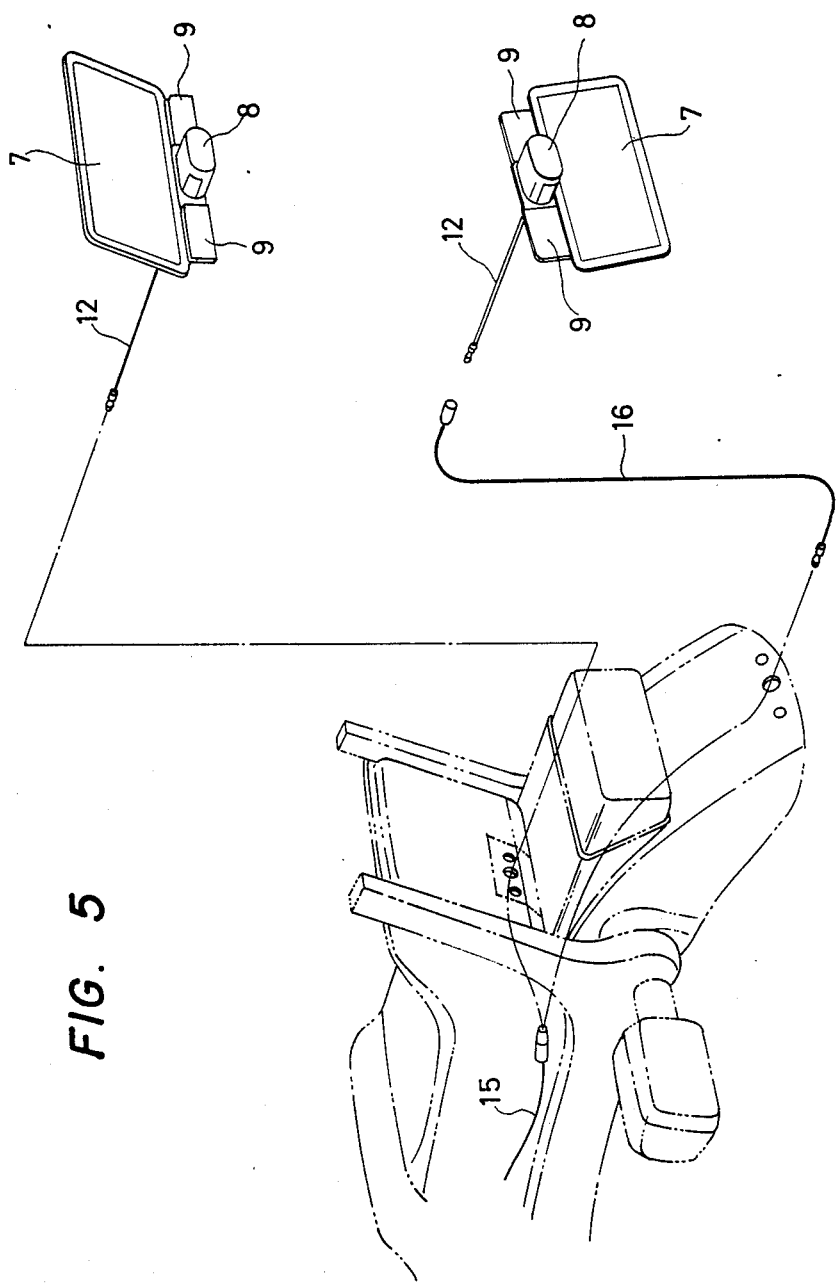
FIG. 5 is a diagram showing mounting positions and respective wiring connections.
Figure 6:
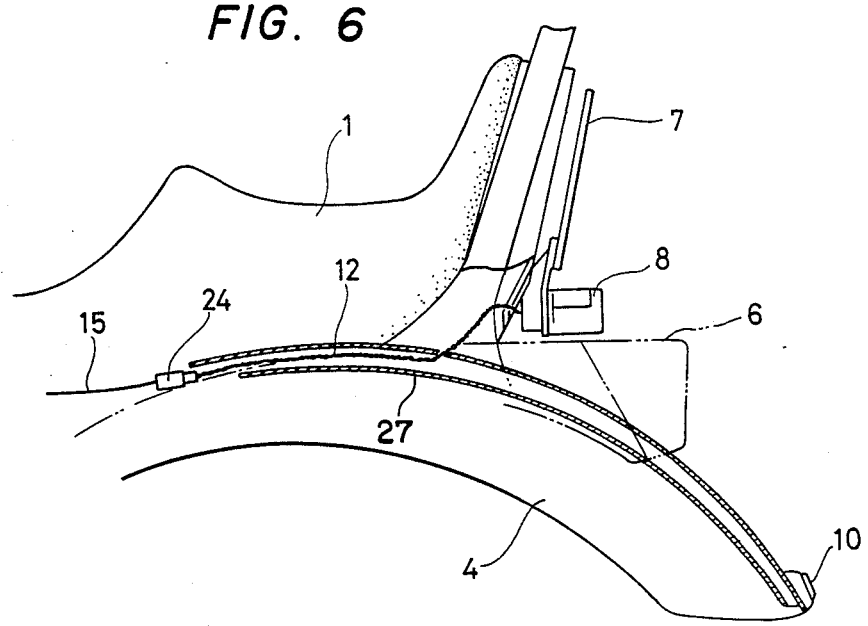
FIGS. 6 and 7 are wiring diagrams showing connections between the license cord and the wire harness in the respective attachement positions.
Figure 7:
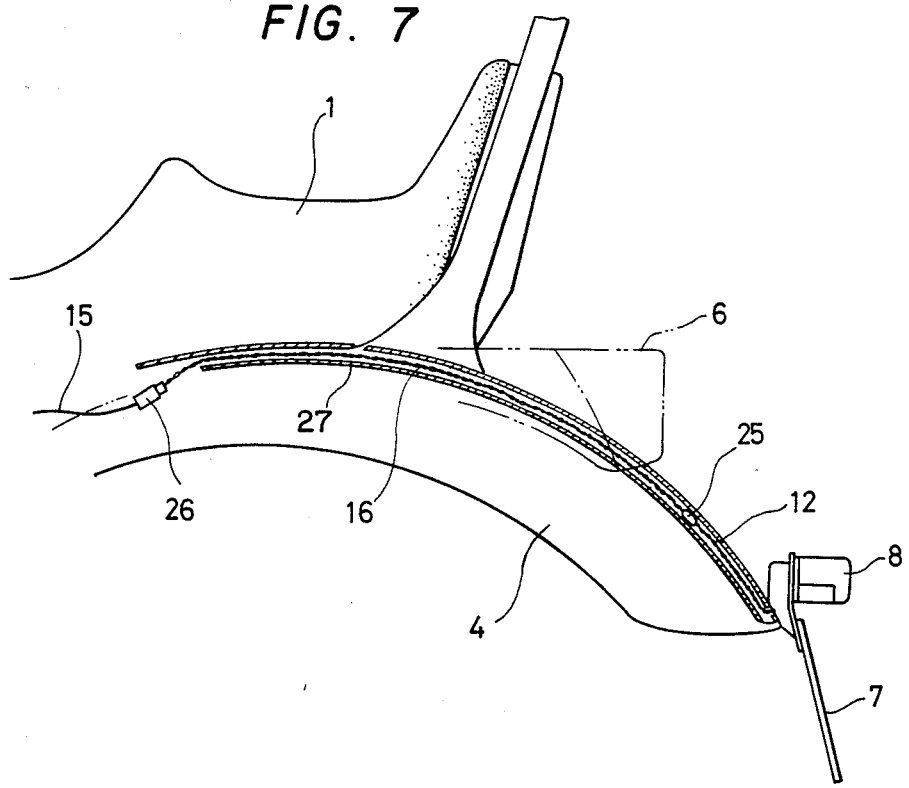

As shown in FIG. 5, a wire harness 15 which is to be connected to the license cord 12 is extended to the area near the rear end of the seat 1. When the license plate 7 is attached to the rear end of the seat 1, the wire harness is directly connected to the license cord 12 through a connector 24 as shown in FIG. 6, whereas, when the license plate 7 is attached to the rear portion of the rear fender, a sub-cord 16 is used via connectors 25 and 26, as will be seen from FIG. 7. The passage 27 extends between the fender plates to contain the cord 12.

Figure 8:
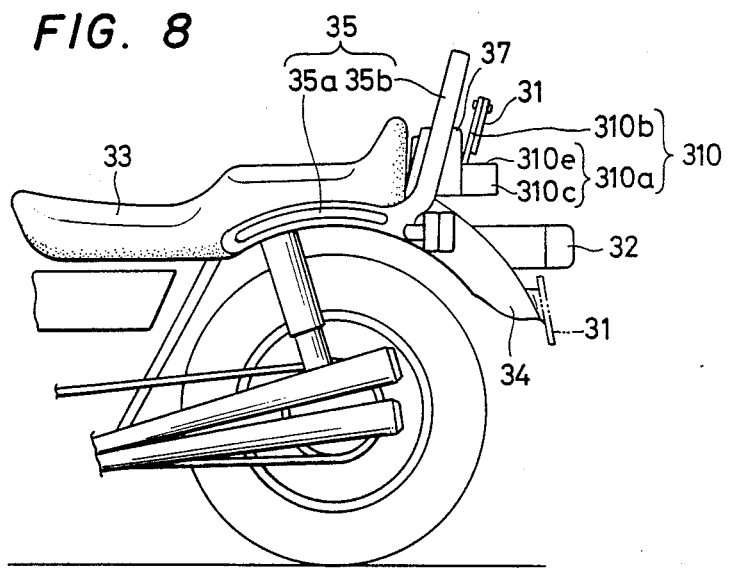
FIG. 8 is a side elevational view showing the rear part of a motorcycle according to a second embodiment of the invention.
Figure 9:
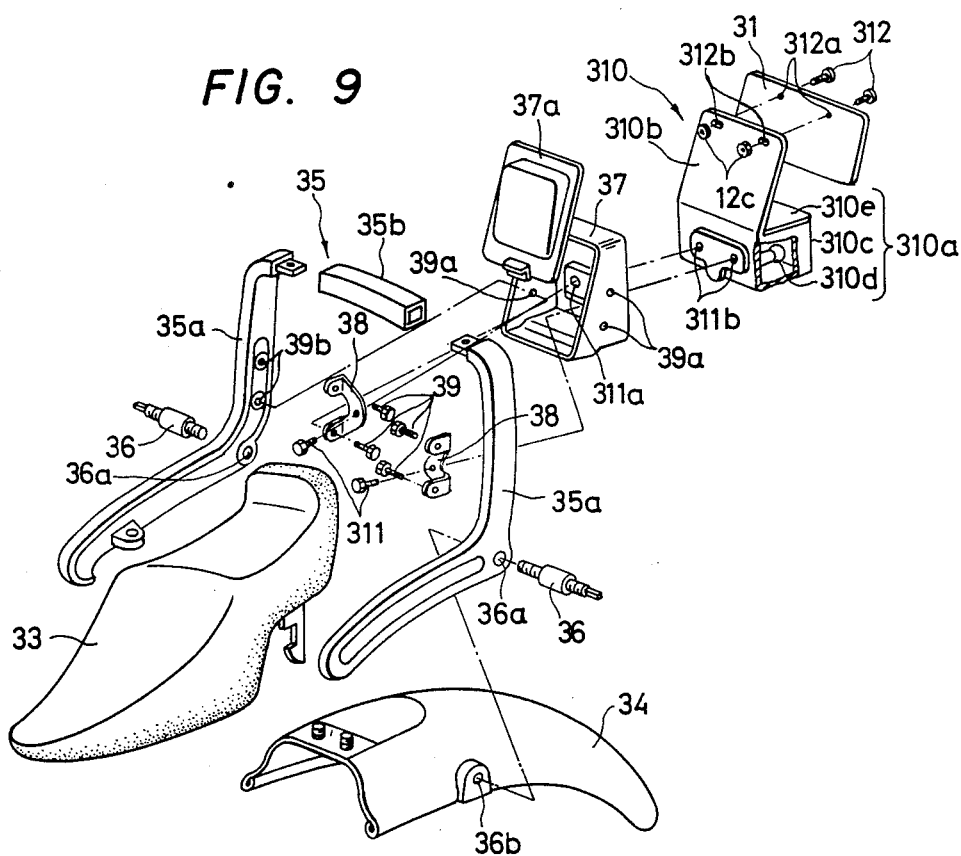
FIG. 9 is an exploded perspective view of the upper portion of the rear part of the motorcycle of FIG. 8.

A second embodiment of the invention will now be described with reference to FIG. 8, which shows the rear part of a motorcycle to which the invention is applied, and FIG. 9, which is an exploded perspective view of the upper portion of the rear part of the motorcycle. The rear part of the motorcycle has a seat mounting (not shown) on which is mounted a seat 33, and a rear fender 34 to which is attached a split type grip 35 which consists of a pair of substantially L-shaped side grips 35a and a rear grip 35b. The fixing of the grip 35 is carried out by inserting and tightening screws of rear blinker brackets 36 into the mounting holes 36a in the side grips 35a and mounting holes 36b in the rear fender 34. Between the pair of side grips 35a is disposed a tool box 37 through adapters 38 positioned at both sides of the tool box. The tool box 37 is fixed by means of screws 39 which are inserted from the inner side of the box into tool box mounting holes 39a and screwing the same into threaded holes 39b in the side grips 35a. The tool box has a lid 37a, which is usually covered by the seat 33, so that the lid cannot be opened unless the seat is lifted after unlocking a seat lock. This arrangement provides a burglarproof function to protect the tools against theft.

A license plate mounting member 310 with a license lamp, in accordance with this embodiment of the invention, is attached to the rear surface of the tool box and is fixed thereto through the adapters 38 by means of screws 311 which are screwed into threaded holes 311b in the mounting plate 310 from the inner side of the tool box through mounting holes 311a formed in the wall thereof. The license plate mounting member 310 is composed of a box-shaped license member 310 and a license plate bracket 310b formed as a unit with the license lamp 310a and standing upright therefrom. The license lamp 310a includes a license bulb 310d housed by lamp housing 310c, and has a white transparent plate 310e constituting an upper wall thereof, while the other walls are made of a light shielding material, so that light in only projected upwardly fromm the license lamp 310a. The license plate bracket 310b is provided with mounting holes 310b corresponding to the mounting holes 312a in the license plate. The license plate is fixed to the license plate bracket 310b by means of bolts 312 inserted into the mounting holes 312a and 312b and nuts 312c screwed onto the bolts 312, and is sealed in a manner known per se.

Thus, the screws or the like members for fixing the license plate mounting member do not appear at all on the outer side. For detaching the license plate mounting member 310, it is necessary to unscrew and withdraw the screws 39 or 311 after opening the lid 37a of the tool box. This can be done only after lifting the seat 33 subsequently to unlocking of the seat lock. Thus, the theft of the license plate is completely avoided by employing an appropriate seat lock.

Although in this embodiment, the license plate mounting member 310 was secured to the rear side of the tool box 37, this arrangement is not exclusive and the license plate mounting member 310 can be attached to other portions such as a higher portion of the side grips 35b. Needless to say, suitable locking measures are taken to avoid easy detachment of the license plate.

Figure 10:
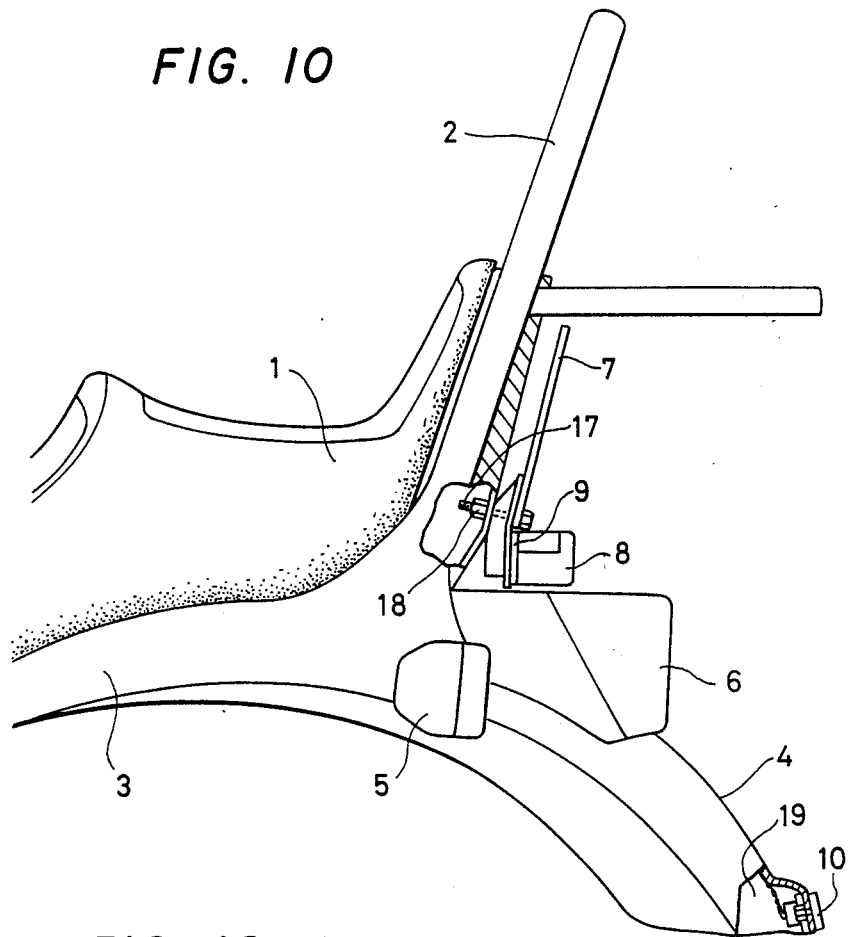
FIGS. 10 and 10a show a further modified arrangement.
Figure 10A:
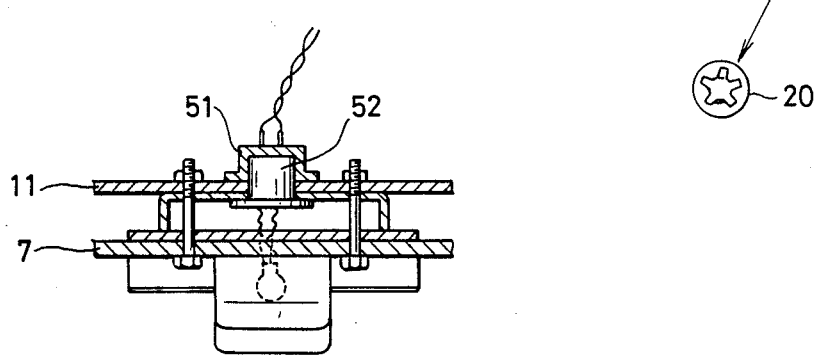

A further embodiment of the invention is shown in FIGS. 10 and 10a. In this embodiment, the electrical connection method is altered by providing electrical lead wires from the harness directly to the two license plate connection positions. Moreover, at the end of each lead wires is attached a female connector 51 which is secured to the backside of the support member 11 of the rear fender 4.

The license lamp 8 is in turn connected to a male connector 52, to that in assembly, it is necessary only to "plug-in" the male connector to achieve electrical connection. As seen in FIG. 10a, the tag support 7 is fastened to the support 11 using removable bolts which are receivable within nuts fixed to the support. When the bolts are removed, the assembly can be removed from the body after unplugging connector 51.

If it is desired to then relocate the tag assembly on the rear fender, it is necessary only to invert the support 7 and lamp 8 and attach the same to the fender in the same manner as previously connected to the support 11. Of course, it is also necessary to remove the mark plate 10, if attached, which also in this case covers the female receptacle 51 mounted on the fender 4. The mark plate may also be connected directly to the receptacle 51, if necessary, to protect the latter from water and road debris.

As has been described, according to the invention, the license plate is detachably secured to the body and the position of the license plate can be easily changed. It is, therefore, always possible to mount the license plate at a position such as will permit easy visual observation of the license plate.

As also described above, according to the invention, a license plate bracket is formed as a unit with the license lamp and, hence, the license lamp is constructed as a body separate from the tail lamp, to thereby make it possible to mount the license plate at any desired level with respect to the tail lamp. In consequence, according to the invention, it is possible to prevent the dirtying of the license plate due to mud and the like while improving the appearance of the motorcycle to enhance the commercial value thereof as compared with the conventional construction.

What is claimed is:

1. A motorcycle license plate mounting mechanism, comprising; a license plate adapted to be attached to the body of the motorcycle, the attachment position of said license plate being changeable, said body providing separated mounting locations for said license plate; license plate mounting means engageable at said mounting positions, a lamp for illuminating said license plate, wiring means for said lamp and a wiring harness engaging said wiring means.

2. An apparatus as claimed in claim 1, comprising at least a pair of said mounting locations, at least one of said mounting locations being provided above a tail light of said motorcycle.

3. An apparatus as claimed in claims 1 or 2, including a first mounting location at the rear of a seat of said motorcycle and above a tail light thereof, and a second mounting location on a fender below said tail light.

4. An apparatus as claimed in claim 3, said rear of said seat abutting a mounting plate, and said license plate mounting means engageable with said mounting plate.

5. An apparatus as claimed in claim 1, further including an electrical connector mounted at both of said mounting locations, said license plate mounting means including a mating electrical connector.

6. An apparatus as claimed in claim 5, and including cover means for protecting that one of said electrical connectors which is not connected with said mating electrical connector at a given time.

7. An apparatus as claimed in claim 5, said connector and said mating connector comprising an electrical socket and plug, respectively.

8. An apparatus as claimed in claim 1, including a lead hole for passing said wiring means connected to said lamp.

9. An apparatus as claimed in claim 8, including a wiring holder means located at inner surface of said rear fender.

* * * * *